(12) United States Patent
Mummidi et al.

(10) Patent No.: US 10,414,149 B2
(45) Date of Patent: Sep. 17, 2019

(54) MATERIAL ESTIMATE FOR FABRICATION OF THREE-DIMENSIONAL OBJECT

(71) Applicant: Microsoft Technology Licensing, LLC, Redmond, WA (US)

(72) Inventors: Lakshmi Narayana Mummidi, Bellevue, WA (US); Parmjeet Singh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 15/299,849

(22) Filed: Oct. 21, 2016

(65) Prior Publication Data

US 2018/0111335 A1 Apr. 26, 2018

(51) Int. Cl.
*B29C 67/00* (2017.01)
*B33Y 10/00* (2015.01)
(Continued)

(52) U.S. Cl.
CPC .............. *B33Y 50/00* (2014.12); *B29C 64/20* (2017.08); *B29C 64/386* (2017.08); *B33Y 10/00* (2014.12); *B33Y 30/00* (2014.12); *G06N 20/00* (2019.01)

(58) Field of Classification Search
CPC ...... G06N 99/005; G06N 20/00; B33Y 50/00; B33Y 10/00; B33Y 30/00; B29C 64/386; B29C 64/20
(Continued)

(56) References Cited

U.S. PATENT DOCUMENTS

| 8,747,097 B2 | 6/2014 | Pettis |
| 9,245,061 B2 | 1/2016 | Schouwenburg |

(Continued)

FOREIGN PATENT DOCUMENTS

| CN | 103747101 A | 4/2014 |
| WO | 2014193311 A1 | 12/2014 |
| WO | 2015173063 A1 | 11/2015 |

OTHER PUBLICATIONS

"Analyze and estimate the cost of your 3D printing project using Cura", http://www.protobuilds.com/estimate, Retrieved on: Sep. 26, 2016, 1 page.
(Continued)

*Primary Examiner* — Ly D Pham

(57) ABSTRACT

The system includes a predictive model trained to estimate an amount of material to be used to fabricate three-dimensional objects. The system further includes an estimation component that receives information regarding the three-dimensional object. The estimation component, using the predictive model, estimates the amount of material to be used to fabricate the three-dimensional object based upon the information regarding the three-dimensional object. The estimation component compares the estimated amount of material with an available amount to determine whether the material available is less than the estimated amount of material to fabricate the three-dimensional object. When it is determined the material available is less than the estimated amount of material, the estimation component can perform an action such as preventing commencement of a fabrication process and/or providing information to a user. The predictive model can be adaptively updated based upon an actual amount of material used during the fabrication process.

15 Claims, 8 Drawing Sheets

(51) Int. Cl.
  *B33Y 30/00* (2015.01)
  *B33Y 50/00* (2015.01)
  *G06N 5/04* (2006.01)
  *G06N 99/00* (2019.01)
  *B29C 64/20* (2017.01)
  *B29C 64/386* (2017.01)
  *G06N 20/00* (2019.01)

(58) Field of Classification Search
  USPC .......................................................... 706/12
  See application file for complete search history.

(56) References Cited

U.S. PATENT DOCUMENTS

| | | | |
|---|---|---|---|
| 9,495,764 B1* | 11/2016 | Boardman | G06T 7/602 |
| 2006/0127153 A1* | 6/2006 | Menchik | B41J 2/175 |
| | | | 400/62 |
| 2010/0104199 A1* | 4/2010 | Zhang | G06K 9/00798 |
| | | | 382/199 |
| 2013/0328228 A1* | 12/2013 | Pettis | F16M 11/12 |
| | | | 264/40.1 |
| 2014/0223583 A1 | 8/2014 | Wegner et al. | |
| 2015/0005919 A1 | 1/2015 | McGatha et al. | |
| 2015/0045928 A1 | 2/2015 | Perez et al. | |
| 2015/0057784 A1 | 2/2015 | Butler et al. | |
| 2015/0283763 A1* | 10/2015 | Chi | G05B 15/02 |
| | | | 700/119 |
| 2015/0331402 A1 | 11/2015 | Lin et al. | |
| 2016/0159012 A1 | 6/2016 | Lee et al. | |
| 2016/0263836 A1* | 9/2016 | Yoshida | B29C 67/0088 |
| 2016/0330431 A1* | 11/2016 | Shim | H04N 1/00278 |
| 2017/0046104 A1* | 2/2017 | Van Vonderen | B41J 2/165 |
| 2017/0173884 A1* | 6/2017 | Ryan | B29C 64/106 |
| 2018/0264735 A1* | 9/2018 | Vilajosana | B33Y 30/00 |

OTHER PUBLICATIONS

"How 3D prints are priced at Shapeways", http://www.shapeways.com/support/pricing, Retrieved on: Sep. 26, 2016, 5 pages.

"Makerbot Desktop", http://www.makerbot.com/desktop, Retrieved on: Sep. 26, 2016, 3 pages.

* cited by examiner

MATERIAL ESTIMATE FOR FABRICATION OF THREE-DIMENSIONAL OBJECT

BACKGROUND

Three-dimensional objects can be fabricated by various ways including printing and additive process(es). Further, materials consumed can vary by printer or additive process. In order to generate three-dimensional objects, a representation of the three-dimensional object to be fabricated (e.g., 3MF file) is segmented along the z-axis by a renderer into slices. These slices are then successively utilized to fabricate the three-dimensional object.

SUMMARY

Described herein is a system for estimating material for fabrication of a particular three-dimensional object comprising a computer comprising a processor and a memory. The memory comprises a predictive model trained to estimate an amount of material to be used to fabricate three-dimensional objects.

The memory further comprises an estimation component configured to receive information regarding the particular three-dimensional object. The estimation component is further configured to, using the predictive model, estimate the amount of material to be used to fabricate the particular three-dimensional object based upon the information regarding the particular three-dimensional object. The estimation component is further configured to compare the estimated amount of material with an available amount of material to determine whether the material available is less than the estimated amount of material to fabricate the particular three-dimensional object. The estimation component is further configured to, when it is determined the material available is less than the estimated amount of material, perform an action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
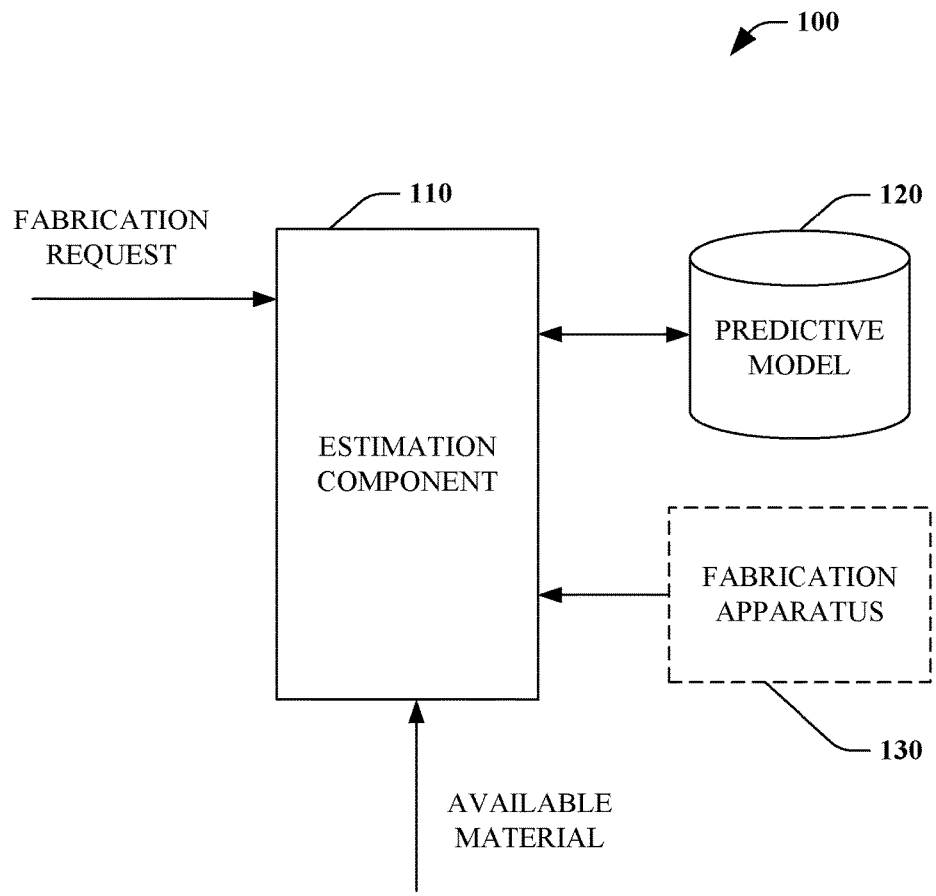
FIG. 1 is a functional block diagram that illustrates a system for estimating material for fabrication of a three-dimensional object.

Various technologies pertaining to estimation of material for fabrication (e.g., printing) of a three-dimensional object are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding estimation of material for fabrication (e.g., printing) of a three-dimensional object. What follows are one or more exemplary systems and methods.

Aspects of the subject disclosure pertain to the technical problem of estimating material(s) to fabricate a particular three-dimensional object. The technical features associated with addressing this problem involve using a machine learning algorithm to train a predictive model for use in estimating material(s) for fabricating a three-dimensional object and/or using the trained predictive model to estimate material to be used to fabricate the particular three-dimensional object. Accordingly, aspects of these technical features exhibit technical effects of more efficiently and effectively fabricating three-dimensional objects, for example, reducing wasted material and/or waste fabrication time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for estimating material for fabrication of a three-dimensional object 100 is illustrated. The system 100 can be used to estimate material, for example, to reduce material waste and/or to increase quality control.

The system 100 includes an estimation component 110 that receives information (e.g., a file) about a three-dimensional object to be fabricated (e.g., printed). In one embodiment, the information comprises a 3D Manufacturing Format file (e.g., 3MF file). The 3MF format describes a set of conventions for the use of XML and other widely available technologies to describe content and appearance of three-dimensional model(s). For example, a 3MF file can include a list of vertices, triangles and meshes for fabricating the three-dimensional object. While the use of 3MF file(s) is discussed herein, those skilled in the art will recognize that the subject disclosure is not limited to 3MF files and that the subject disclosure can be utilized with any suitable representation of three-dimensional object(s) including, for example, object (OBJ) files, stereo lithography (STL) files, virtual reality modeling language (VRML) files, X3G files, polygon (PLY) files and/or filmbox (FBX) files.

The system further includes a predictive model 120 for use in estimating material(s) for fabricating the three-dimensional object. In one embodiment, the predictive model 120 is trained using a machine learning algorithm, as discussed in greater detail with respect to FIG. 3.

The estimation component 120 can further receive information about material(s) available for fabrication by a fabrication apparatus 130 (e.g., three-dimensional printer). In one embodiment, the information received is based on user input. For example, the user can provide information about material(s) available for fabrication by the fabrication apparatus 130. In one embodiment, the information is received directly from the fabrication apparatus 130. For example, the information can be received in response to a query for available material(s) sent by the estimation component 110.

Based upon the received information (e.g., 3MF file) about a three-dimensional object to be fabricated and the predictive model 120, the estimation component 110 can estimate an amount of material(s) to be used in fabricating the three dimensional object. In estimating material(s) to be used in fabricating the three-dimensional object, the estimation component 110 can utilize one or more of: a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus and/or a material manufacturer of material utilized by the fabrication apparatus. The estimation component 110 can compare the estimated amount of material(s) with the available material(s) to determine whether or not material(s) are available to fabricate the three-dimensional object.

If the estimation component 110 determines that material(s) are available to fabricate the three-dimensional object, the estimation component 110 can allow fabrication to commence. However, if the estimation component 110 determine that the material(s) available are not sufficient to fabricate the three-dimensional object, the estimation component 110 can perform an action.

In one embodiment, the action performed comprises preventing commencement of the fabrication process. In one embodiment, the action performed comprises providing information to the user indicating that insufficient material(s) are available to successfully fabricate the three-dimensional object. In one example, the user can increase material(s) available for fabrication, ignore the information and allow fabrication to commence and/or cancel fabrication of the three-dimensional object. By preventing commencement of the fabrication process when insufficient material(s) are determined to be available, waste of fabrication material and/or waste of utilization of the fabrication apparatus are mitigated.

Figure 2:
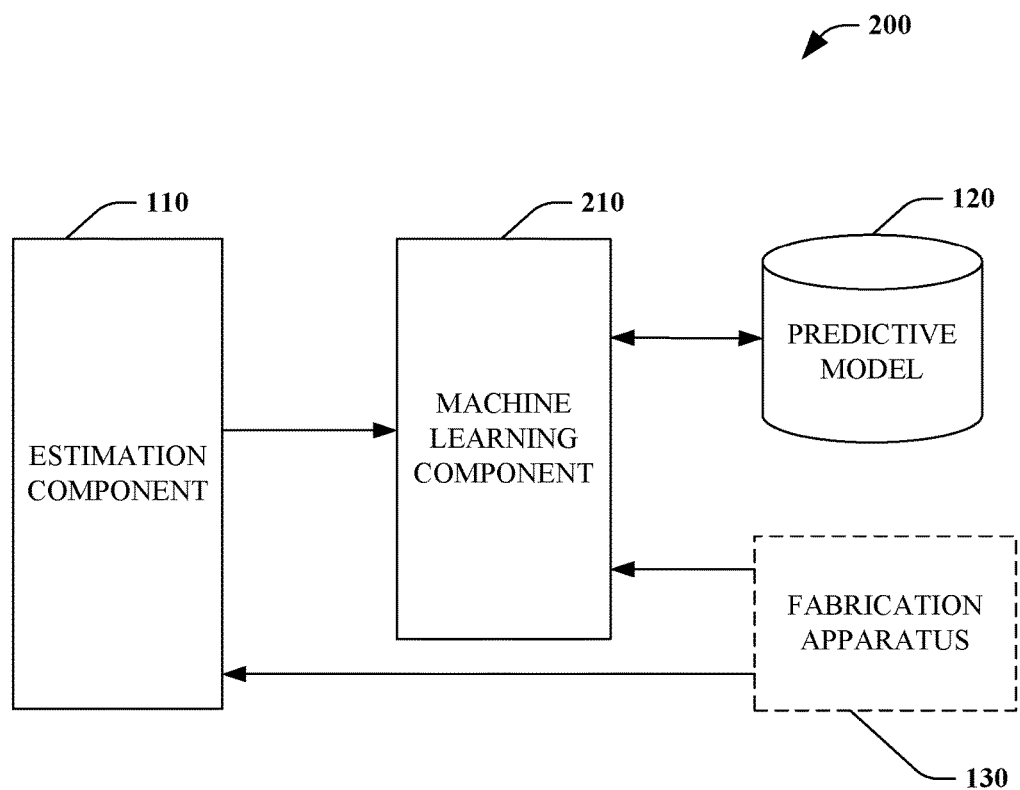
FIG. 2 is a functional block diagram of a system for estimating material for fabrication of a three-dimensional object.

Turning to FIG. 2, a system for estimating material for fabrication of a three-dimensional object 200 is illustrated. The system 200 includes the estimation component 110 and the prediction model 120. The system 200 further includes a machine learning component 210 that adaptively updates the prediction model 120.

In one embodiment, the machine learning component 210 updates the prediction model 210, after fabrication of the three-dimensional object. The machine learning component 210 updates the prediction model 210 based upon the received information (e.g., 3MF file) about a three-dimensional object to be fabricated (e.g., printed), the amount of material(s) estimated by the estimation component 110 using the predictive model 120 and an actual amount of material(s) used during the fabrication process.

In one embodiment, the actual amount of material(s) used during the fabrication process is based upon information provided by the user (e.g., amount of material(s) available after fabrication of the three-dimensional object.) The actual amount of material(s) used can be the difference between the amount of material(s) available prior to commencement of the fabrication process and the amount of material(s) available after fabrication of the three-dimensional object. In one embodiment, the actual amount of material(s) used during the fabrication process can be received in response to a query for available material(s) sent by the estimation component 110 and/or the machine learning component 210 to the fabrication apparatus 130. The machine learning component 210 stores the updated prediction model 120, for example, for use in estimating material(s) for fabrication of additional three-dimensional object(s)

Figure 3:
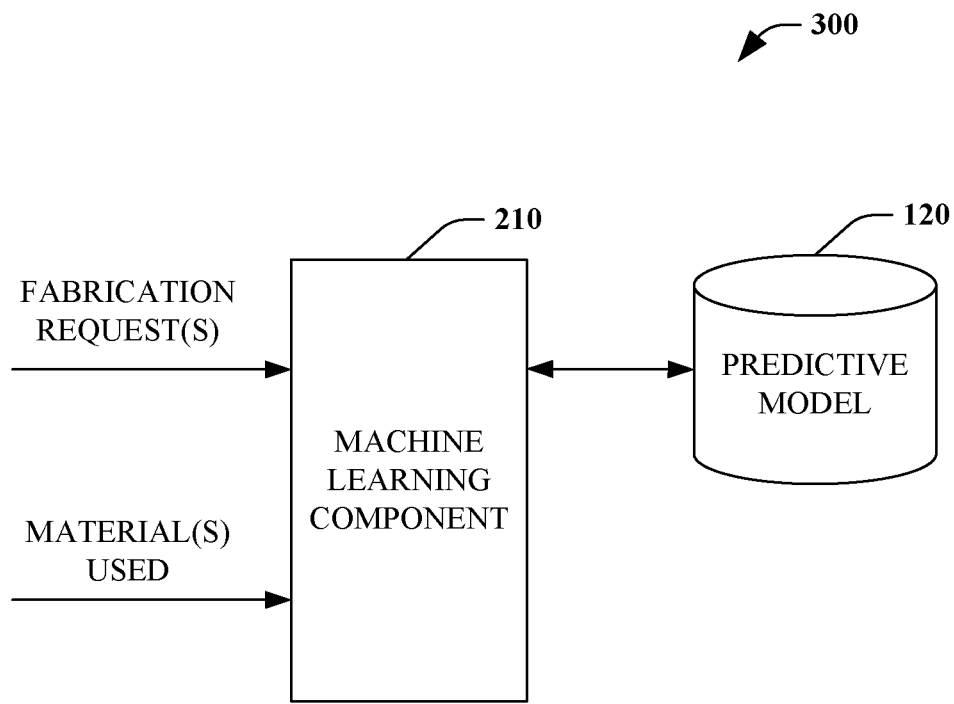
FIG. 3 is a functional block diagram of a system for training a predictive model.

Next, turning to FIG. 3, a system for training a predictive model 300 is illustrated. The system 300 includes a machine learning component 210 and the prediction model 120. The system 300 can receive information regarding a plurality of three-dimensional object fabrication requests and actual material(s) used to fabricated each of the associated three-dimensional objects. The machine learning component 210 can utilize the requests and actual materials used to train the prediction model 120 to estimate material(s) for fabrication requests.

In one embodiment, the information regarding the plurality of three-dimensional object fabrication requests can be obtained from a print queue serving a particular three-dimensional printer. In this manner, historical information regarding usage of the particular three-dimensional printer can be utilized to adaptively train the prediction model 120.

In one embodiment, the information regarding the plurality of three-dimensional object fabrication requests can include one or more of: a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus, a material manufacturer of material utilized by the fabrication apparatus, start material percentage and/or end material percentage. For example, the machine learning component 210 can assign weights to various elements of the information in order to train the prediction model 120.

Figure 4:
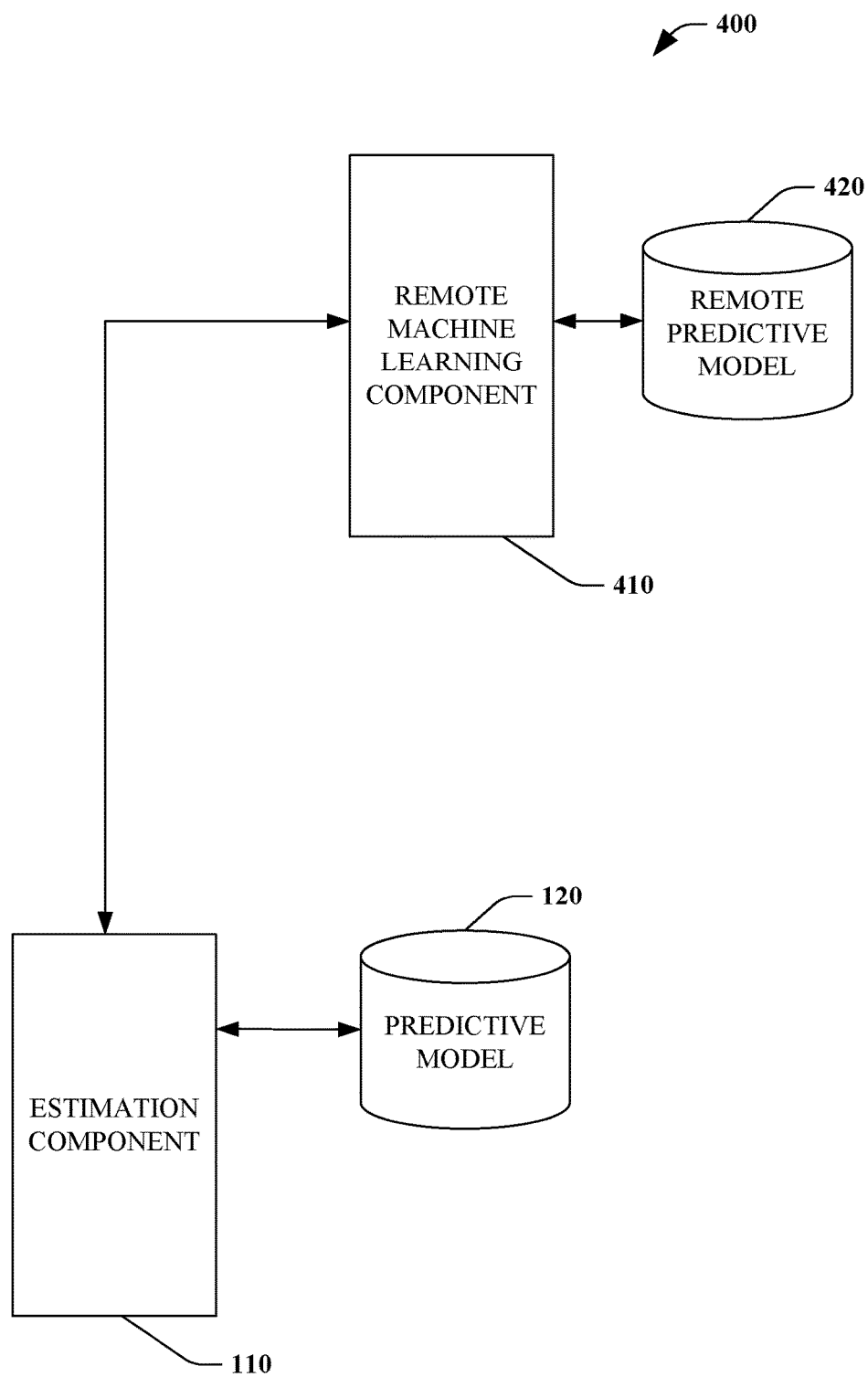
FIG. 4 is a functional block diagram of a system for updating a prediction model.

Referring to FIG. 4, a system for updating a prediction model 400 is illustrated. The system 400 includes the estimation component 110 and the prediction model 120. The estimation component 110 is communicatively coupled (e.g., via the Internet) to a remote machine learning component 410 having a remote prediction model 420.

Information can be exchanged between the estimation component 110 and the remote machine learning component 410. In one embodiment, the estimation component 110 provides information regarding fabrication requests and actual usage to the remote machine learning component 410. The remote machine learning component 410 can adaptively update the remote prediction model 420 based upon information from one or more estimation components 110.

In one embodiment, the remote machine learning component 410 provides the remote prediction model 420 to the estimation component 110. The estimation component 110 can then replace contents of the prediction model 120 with the received remote prediction model 420. In this manner, the estimation component 110 can benefit from material estimation performed over a plurality of fabrication sites.

Figure 5:
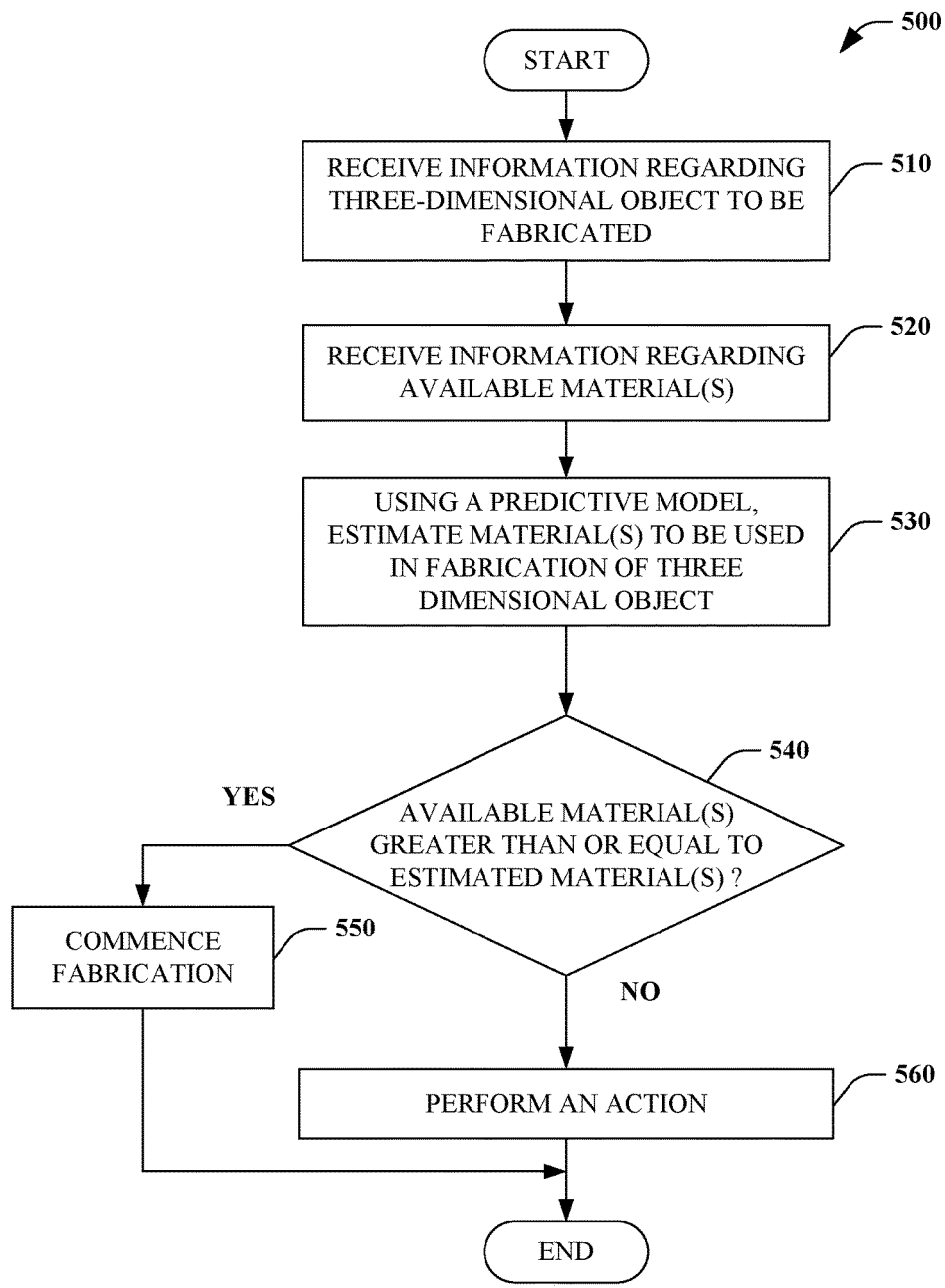
FIG. 5 illustrates an exemplary methodology of a method of estimating material for fabrication of a three-dimensional object.
Figure 6:
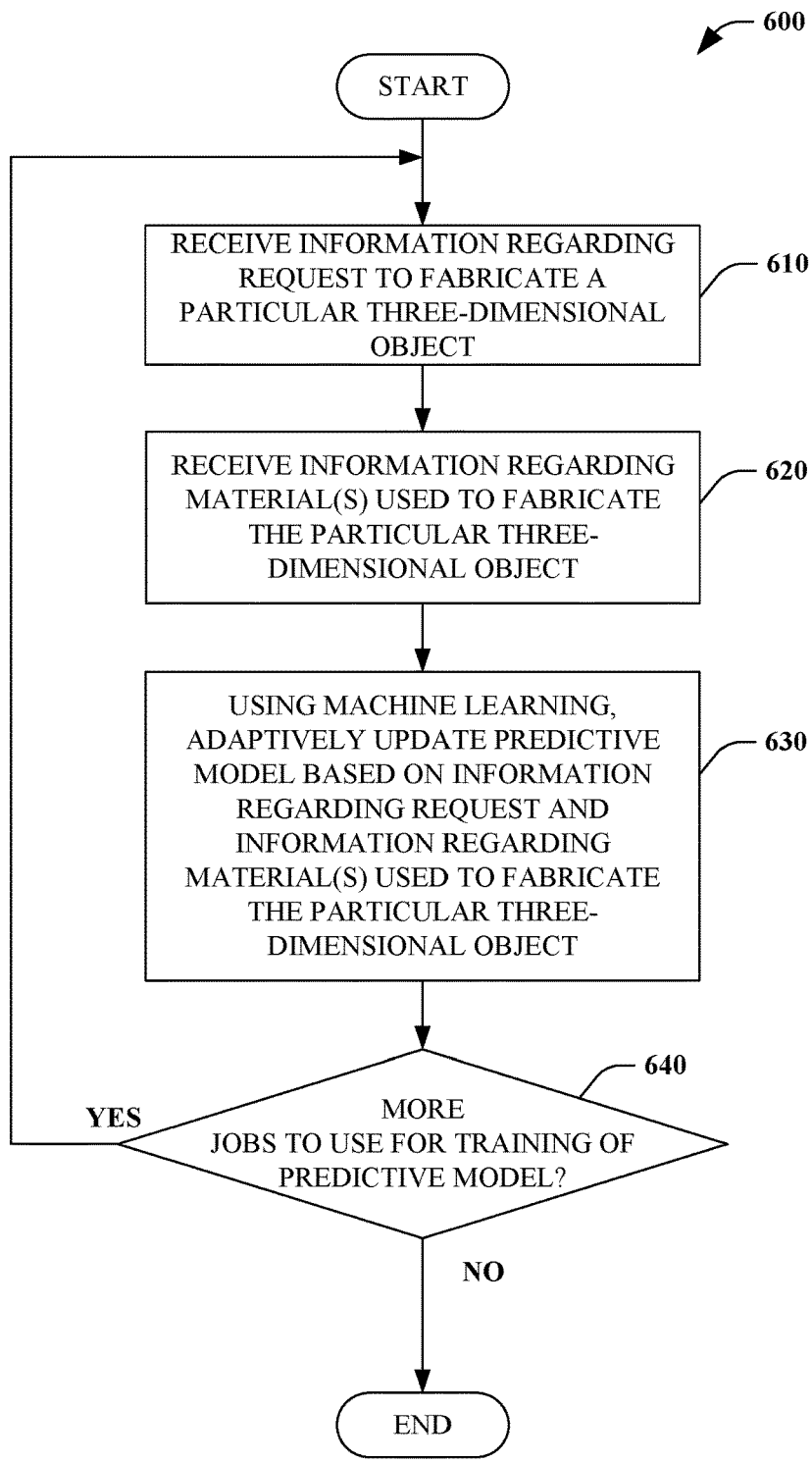
FIG. 6 illustrates an exemplary methodology of a method of training a predictive model.
Figure 7:
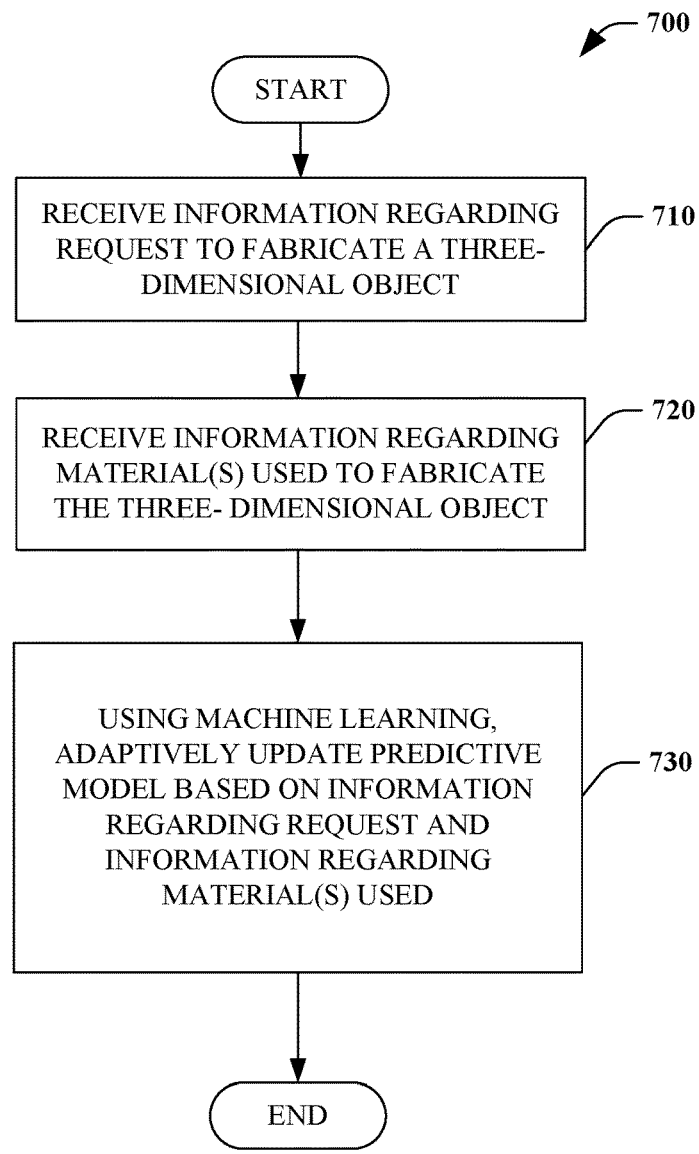
FIG. 7 illustrates an exemplary methodology of a method of updating a predictive model.

FIGS. 5, 6 and 7 illustrate exemplary methodologies relating to estimating material(s) for fabrication of a three-dimensional object. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of estimating material for fabrication of a three-dimensional object 500 is illustrated. For example, the method 500 can be used to estimate material, for example, to reduce material waste and/or to increase quality control.

At 510, information regarding a three-dimensional object to be fabricated is received. In one embodiment, the information comprises a 3MF file. At 520, information regarding available material(s) for fabrication is received. In one embodiment, a user provides information about material(s) available for fabrication by a fabrication apparatus. In one embodiment, the information is received directly from the fabrication apparatus 130.

At 530, using a predictive model, material(s) to be used in fabrication of the three-dimensional object are estimated. For example, the predictive model can utilize a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus and/or a material manufacturer of material utilized by the fabrication apparatus. In one embodiment, the estimate of material to be used in fabrication is provided, for example, to a user.

At 540, a determination is made as to whether the available material(s) are greater than or equal to the estimated material(s). If the determination at 540 is YES, at 550, fabrication of the three-dimensional object is commenced.

If the determination at 540 is NO, at 560, an action is performed. In one embodiment, the action performed comprises preventing commencement of the fabrication process. In one embodiment, the action performed comprises providing information to the user indicating that insufficient material(s) are available to successfully fabrication the three-dimensional object. For example, the user can increase material(s) available for fabrication, ignore the information and allow fabrication to commence and/or cancel fabrication of the three-dimensional object. By preventing commencement of the fabrication process when insufficient material(s) are determine to be available, waste of fabrication material and/or waste of utilization of the fabrication apparatus are mitigated.

Turning to FIG. 6, a method of training a predictive model 600 is illustrated. At 610, information regarding a request to fabricate a particular three-dimensional object is received. In one embodiment, the information regarding the particular three-dimensional object fabrication requests can be obtained from a print queue serving a particular three-dimensional printer. As such, historical information regarding usage of the particular three-dimensional printer can be utilized to adaptively train the prediction model.

At 620, information regarding material(s) used to fabricate the particular three-dimensional object is received. an actual amount of material(s) used during the fabrication process. In one embodiment, the actual amount of material(s) used during the fabrication process is based upon information provided by the user (e.g., amount of material(s) available after fabrication of the three-dimensional object. The actual amount of material(s) used can be the difference between the amount of material(s) available prior to commencement of the fabrication process and the amount of material(s) available after fabrication of the three-dimensional object. In one embodiment, the amount of material(s) used to fabricate the particular three-dimensional object can be received from a fabrication apparatus. For example, the amount of material(s) can be provided in response to a query.

At 630, using machine learning, a predictive model is adaptively updated based on the information regarding the request and the information regarding material(s) used to fabricate the particular three-dimensional object. In one embodiment, the predictive model can utilize a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus, a material manufacturer of material, start material percentage and/or end material percentage utilized by the fabrication apparatus in estimating material(s) to be used in fabrication of the three-dimensional object.

At 640, a determination is made as to whether there are more jobs to use for training of the predictive model. If the determination at 640 is YES, processing continues at 610. If the determination at 640 is NO, the method 600 ends.

Turning to FIG. 7, a method of updating a predictive model 700 is illustrated. At 710, information regarding a request to fabricate a three-dimensional object is received. At 720, information regarding material(s) used to fabricate the three-dimensional object is received. At 730, using machine learning, a predictive model is adaptively updated based on the information regarding the request and the information regarding material(s) used to fabricate the three-dimensional object.

Described herein is a system for estimating material for fabrication of a particular three-dimensional object including a computer comprising a processor and a memory. The memory includes a predictive model trained to estimate an amount of material to be used to fabricate three-dimensional objects. The memory further includes an estimation component configured to receive information regarding the particular three-dimensional object, the estimation component further configured to, using the predictive model, estimate the amount of material to be used to fabricate the particular three-dimensional object based upon the information regarding the particular three-dimensional object, the estimation component further configured to compare the estimated amount of material with an available amount of material to determine whether the material available is less than the estimated amount of material to fabricate the particular three-dimensional object, the estimation component further configured to, when it is determined the material available is less than the estimated amount of material, perform an action.

The system can include wherein the information about the particular three-dimensional object comprises a 3D Manufacturing Format (3MF) file, an object (OBJ) file, a stereo lithography (STL) file, a virtual reality modeling language (VRML) file, an X3G file, a polygon (PLY) file or a filmbox (FBX) file. The system can further include wherein the information about the particular three-dimensional object comprises a file. The system can further include wherein the predictive model is trained using a machine learning algorithm.

The system can include wherein the available amount of material is based on user input. The system can further include wherein the available amount of material is based on information received from a fabrication apparatus. The system can further include wherein the estimation component utilizes at least one of a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus or a material manufacturer of material utilized by the fabrication apparatus to estimate the amount of material to be used to fabricate the particular three-dimensional object.

The system can include wherein the action performed comprises preventing commencement of a fabrication process. The system can further include wherein the action performed comprises providing information to a user indicating that insufficient material is available to successfully fabricate the particular three-dimensional object. The system can further include a machine learning component configured to receive an actual amount of material used during a fabrication process, the machine learning component further configured to adaptively update the predictive model based on the actual amount of material used.

The system can further include wherein the machine learning component is further configured to train the predictive model based on a plurality of fabrication requests and associated actual amounts of materials used to fabricate three-dimensional objects specified the plurality of fabrication requests.

Described herein is a method of estimating material for fabrication of a three-dimensional object including receiving information regarding the three-dimensional object to be fabricated. The method can further include using a predictive model, estimating an amount of material to be used in fabrication of the three-dimensional object; and providing the estimated amount of material to be used in fabrication of the three-dimensional object.

The method can include receiving information regarding an available amount of material, determining whether the available amount of material is greater than or equal to the estimated amount of material, and when the available amount of material is not greater than or equal to the estimated amount of material, performing an action. The method can further include wherein the available amount of material is based on user input. The method can further include wherein the available amount of material is based on information received from a fabrication apparatus.

The method can include wherein the predictive model is trained using a machine learning algorithm. The method can further include wherein the estimation component utilizes at least one of a job name of the three-dimensional object, a mesh count of the three-dimensional object, a triangle count of the three-dimensional object, a printer name of a fabrication apparatus, a printer driver name of the fabrication apparatus, a printer driver version of the fabrication apparatus, a width of the three-dimensional object, a depth of the three-dimensional object, a height of the three-dimensional object, a quality of the three-dimensional object, a density of the three-dimensional object, a raft used during a fabrication process, a support used during the fabrication process, a slicer speed of the fabrication apparatus, a material type of material utilized by the fabrication apparatus or a material manufacturer of material utilized by the fabrication apparatus to estimate the amount of material to be used to fabricate the three-dimensional object.

Described herein is a computer storage media storing computer-readable instructions that when executed cause a computing device to receive information regarding the three-dimensional object to be fabricated; using a predictive model, estimate an amount of material to be used in fabrication of the three-dimensional object; receive information regarding an available amount of material; determine whether the available amount of material is greater than or equal to the estimated amount of material; and, when the available amount of material is not greater than or equal to the estimated amount of material, perform an action.

The computer storage media can further include wherein the received information regarding the three-dimensional object to be fabricated comprises a 3D Manufacturing Format (3MF) file, an object (OBJ) file, a stereo lithography (STL) file, a virtual reality modeling language (VRML) file, an X3G file, a polygon (PLY) file or a filmbox (FBX) file. The computer storage media can further include wherein the predictive model is trained using a machine learning algorithm.

Figure 8:
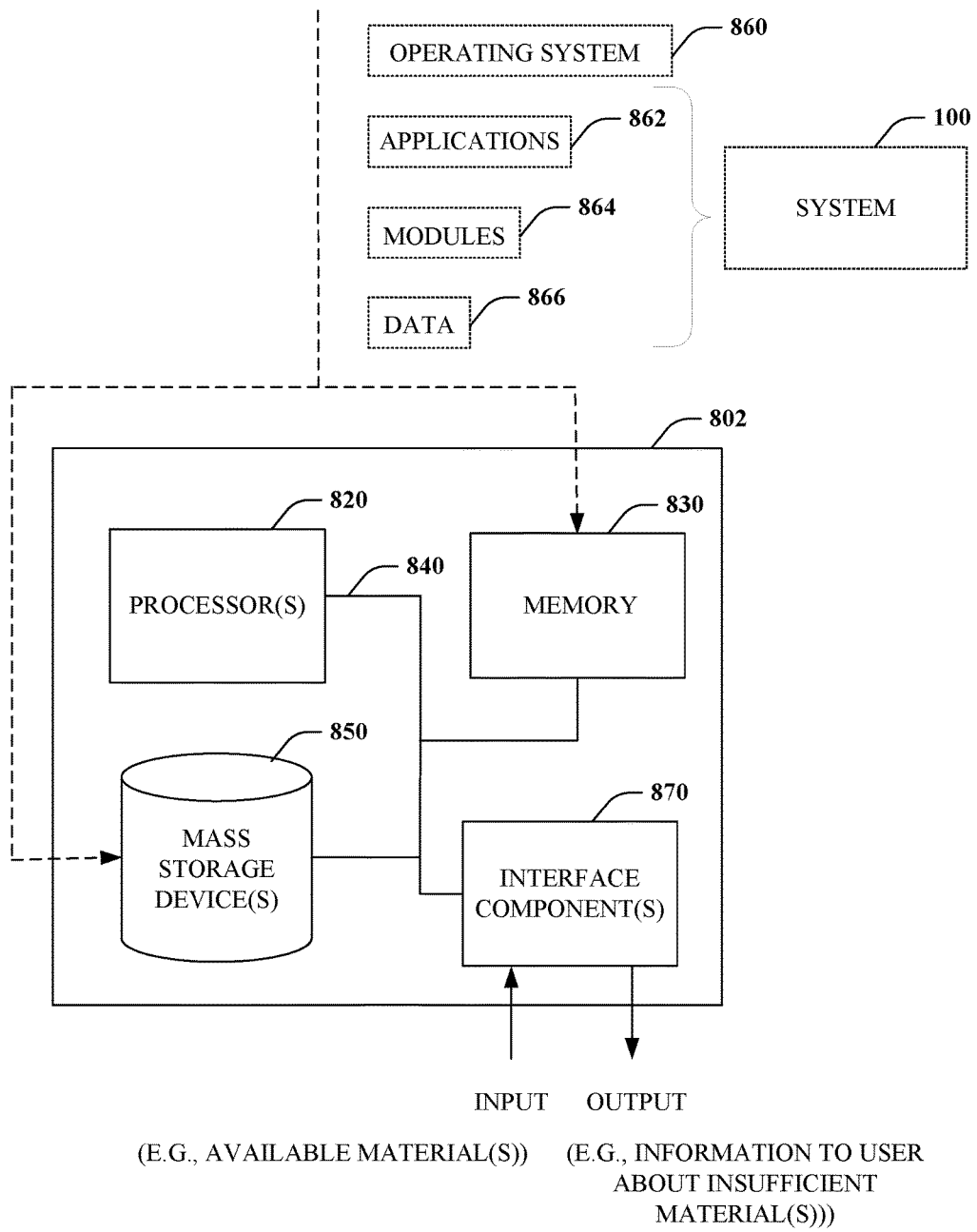
FIG. 8 is a functional block diagram that illustrates an exemplary computing system.

With reference to FIG. 8, illustrated is an example general-purpose computer or computing device 802 (e.g., desktop, laptop, tablet, watch, server, hand-held, programmable consumer or industrial electronics, set-top box, game system, compute node, etc.). For instance, the computing device 802 may be used in a system for estimating material(s) for fabrication of a three-dimensional object 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby. In one example, application 862 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for estimating material for fabrication of a particular three-dimensional object, comprising:
    a computer comprising a processor and a memory, the memory comprising:
    a predictive model trained to estimate an amount of material to be used to fabricate three-dimensional objects;
    an estimation component configured to receive information regarding the particular three-dimensional object, the estimation component further configured to, using the predictive model, estimate the amount of material to be used to fabricate the particular three-dimensional object based upon the information regarding the particular three-dimensional object, wherein the predictive model is trained based on a plurality of fabrication requests and associated actual amounts of materials used to fabricate three-dimensional objects specified by the plurality of fabrication requests, the estimation component further configured to compare the estimated amount of material with an available amount of material to determine whether the material available is less than the estimated amount of material to fabricate the particular three-dimensional object, the estimation component further configured to, when it is determined the material available is less than the estimated amount of material, perform an action, and, when it is determined the material available is greater or equal to the estimated amount of material, fabricate the particular three-dimensional object;
    a machine learning component configured to receive an actual amount of material used during a fabrication process, the machine learning component further configured to adaptively update the predictive model based on the actual amount of material used to fabricate the particular three-dimensional object.

2. The system of claim 1, wherein the information about the particular three-dimensional object comprises a 3D Manufacturing Format (3MF) file, an object (OBJ) file, a stereo lithography (STL) file, a virtual reality modeling language (VRML) file, an X3G file, a polygon (PLY) file or a filmbox (FBX) file.

3. The system of claim 1, wherein the information about the particular three-dimensional object comprises a file.

4. The system of claim 1, wherein the predictive model is trained using a machine learning algorithm.

5. The system of claim 1, wherein the available amount of material is based on user input.

6. The system of claim 1, wherein the available amount of material is based on information received from a fabrication apparatus.

7. The system of claim 1, wherein the estimation component utilizes at least one of a job name of the particular three-dimensional object, a mesh count of the particular three-dimensional object, a triangle count of the particular three-dimensional object, a printer name of a fabrication apparatus, a printer driver name of the fabrication apparatus, a printer driver version of the fabrication apparatus, a width of the particular three-dimensional object, a depth of the particular three-dimensional object, a height of the particular three-dimensional object, a quality of the particular three-dimensional object, a density of the particular three-dimensional object, a raft used during a fabrication process, a support used during the fabrication process, a slicer speed of the fabrication apparatus, a material type of material utilized by the fabrication apparatus or a material manufacturer of material utilized by the fabrication apparatus to estimate the amount of material to be used to fabricate the particular three-dimensional object.

8. The system of claim 1, wherein the action performed comprises preventing commencement of a fabrication process.

9. The system of claim 1, wherein the action performed comprises providing information to a user indicating that insufficient material is available to successfully fabricate the particular three-dimensional object.

10. The system of claim 1, wherein the plurality of fabrication requests and associated actual amounts of materials used to fabricate three-dimensional objects specified by the plurality of fabrication requests are performed over a plurality of fabrication sites.

11. A method of estimating material for fabrication of a three-dimensional object, comprising:

training a predictive model using a machine learning algorithm, wherein the predictive model is trained based on a plurality of fabrication requests and associated actual amounts of materials used to fabricate three-dimensional objects specified by the plurality of fabrication requests;

receiving information regarding a three-dimensional object to be fabricated;

using the predictive model, estimating an amount of material to be used in fabrication of the three-dimensional object;

receiving information regarding an available amount of material from a fabrication apparatus;

determine whether the available amount of material is greater than or equal to the estimated amount of material;

when the available amount of material is not greater than or equal to the estimated amount of material, perform an action; and when the available amount of material is greater the estimated amount of material, fabricate the particular three-dimensional object using the fabrication apparatus, and, adaptively update the predictive model based on an actual amount of material used to fabricate the particular three-dimensional object.

12. The method of claim 11, wherein the available amount of material is further based on user input.

13. The method of claim 11, wherein the estimation component utilizes at least one of a job name of the three-dimensional object, a mesh count of the three-dimensional object, a triangle count of the three-dimensional object, a printer name of a fabrication apparatus, a printer driver name of the fabrication apparatus, a printer driver version of the fabrication apparatus, a width of the three-dimensional object, a depth of the three-dimensional object, a height of the three-dimensional object, a quality of the three-dimensional object, a density of the three-dimensional object, a raft used during a fabrication process, a support used during the fabrication process, a slicer speed of the fabrication apparatus, a material type of material utilized by the fabrication apparatus or a material manufacturer of material utilized by the fabrication apparatus to estimate the amount of material to be used to fabricate the three-dimensional object.

14. A computer storage media storing computer-readable instructions that when executed cause a computing device to:

train a predictive model using a machine learning algorithm, wherein the predictive model is trained based on a plurality of fabrication requests and associated actual amounts of materials used to fabricate three-dimensional objects specified by the plurality of fabrication requests;

receive information regarding a particular three-dimensional object to be fabricated;

using the predictive model, estimate an amount of material to be used in fabrication of the particular three-dimensional object;

receive information regarding an available amount of material from a fabrication apparatus;

determine whether the available amount of material is greater than or equal to the estimated amount of material;

when the available amount of material is not greater than or equal to the estimated amount of material, perform an action;

when the available amount of material is greater the estimated amount of material, fabricate the particular three-dimensional object using the fabrication apparatus; and adaptively update the predictive model based on an actual amount of material used to fabricate the particular three-dimensional object.

15. The computer storage media of claim 14, wherein the received information regarding the three-dimensional object to be fabricated comprises a 3D Manufacturing Format (3MF) file, an object (OBJ) file, a stereo lithography (STL) file, a virtual reality modeling language (VRML) file, an X3G file, a polygon (PLY) file or a filmbox (FBX) file.

* * * * *